United States Patent Office 2,763,559
Patented Sept. 18, 1956

2,763,559

OPTICAL GLASS AND PROCESS FOR ITS PRODUCTION

Gustav Weissenberg, Marburg (Lahn), and Norbert Meinert, Munchhausen, Kreis Marburg, Germany, assignors to Ernst Leitz, G. m. b. H., Wetzlar (Lahn), Germany, a corporation of Germany No Drawing. Application November 6, 1951, Serial No. 255,131

Claims priority, application Germany November 10, 1950

2 Claims. (Cl. 106—47)

Our present invention relates to an optical glass consisting essentially of tellurium oxide and aluminum oxide.

When either tellurium oxide or aluminum oxide alone is melted and cooled below its melting point neither forms a clear amorphous glass but crystalizes. Neither can of itself be considered a glass forming compound. We have found, however, that if tellurium oxide is melted with aluminum oxide in the proportions or percentages by weight of 59.5 to 93.5 of tellurium oxide ($TeO_2$) to 3.6 to 7 of aluminum oxide, the resulting melt may be cooled below its fusion temperature to ordinary atmospheric temperatures without crystal formation and may form a clear amorphous glass. For example a glass may be formed of approximately 93.5% of ($TeO_2$) and 6.5% of aluminum oxide ($Al_2O_3$), the mol proportions of tellurium oxide to aluminum oxide being in this case 9 to 1. The glass of our invention is one, therefore, that consists essentially or predominantly of a melt of tellurium oxide and aluminum oxide within the above ranges and it may also contain for any special purpose slight or small amounts of oxides, or of fluorides, which decompose to oxides in the melt. Examples of such additional substances are fluorides of lithium, calcium, strontium and barium, and the oxides of silicon and alkaline metals, such as sodium, and the oxides of lanthanum, zinc, indium, titanium, thallium, tantalun, germanium, tungsten and bismuth. Such additional substances used in relatively small amounts do not affect the optical properties of the glass.

The coloring of tellurium oxide can be strongly decreased if a higher oxide is used, the percentage relationship to the aluminum oxide being such as to bring it to the equivalent amount of dioxide, for example tellurium trioxide ($TeO_3$) or a mixture of tellurium oxide ($TeO_2$) and tellurium trioxide ($TeO_3$) either with or without additions of inorganic peroxides such as lithium peroxide, sodium peroxide and barium peroxide. When tellurium trioxide or an inorganic peroxide is used oxygen is given off at the higher temperatures which has the advantage of obviating any reduction of the tellurium oxide to tellurium or to other oxidation stages than tellurium dioxide with a consequent avoiding of any coloring effects.

The melting temperatures of these glasses lies between 750° C. and 900° C. Through the addition of cryolite or similar materials one can succeed in making the melt very fluid. In order to obtain specific melts it is recommended to melt in a gold crucible, which is practically not attacked. If one desires a certain aluminum oxide content in the melt, one can melt in a sintered corundum crucible; then the content of $Al_2O_3$ is dependent on the duration of the heating and the temperature. Quartz crucibles are attacked less.

By way of example melts of almost pure tellurium (4)-oxide ($TeO_2$) are cited in Table 1. The content of aluminum oxide is essential. In Table 2, for example, melts with various fluorides of alkali and alkaline earth metals are listed. In Table 3 melts of the listed oxides with tellurium (4)-oxide are shown and in Table 4 a melt of a mixture of tellurium (4)-oxide and tellurium (6)-oxide is shown.

Table 1.—Percent by weight in runs

| Melt No. | $TeO_2$ | $Al_2O_3$ | $SiO_2$ | $Na_2O_2$ | $n_D$ | $\nu$ | Remarks |
|---|---|---|---|---|---|---|---|
| E 304 | 89.5 | 6.7 | | 3.8 | 1.838 | 22.7 | $Al_2O_3$, Crucible. |
| W 145/E 331 | 93.5 | 6.5 | | | 1.956 | 22.4 | $Al_2O_3$, Crucible. |
| E 309 | 90.0 | 6.4 | | 3.6 | 2.036 | 18.2 | Pt, Crucible. |
| E 393 | 88.5 | 7.0 | 2.7 | 1.8 | 1.9831 | 20.9 | $Al_2O_3$, Crucible. |

Table 2.—Percent by weight in runs

| Melt No. | $TeO_2$ | LiF | $CaF_2$ | $SrF_2$ | $BaF_2$ | $SiO_2$ | $Al_2O_3$ | $Na_2O_2$ | $n_D$ | $\nu$ |
|---|---|---|---|---|---|---|---|---|---|---|
| E 345 | 88.5 | 4.4 | | | | 1.0 | 6.2 | | 1.944 | 21.8 |
| E 350 | 82.5 | | 8.3 | | | 1.0 | 6.6 | 1.6 | 1.895 | 26.6 |
| W 148/E 349 | 87.0 | | 4.3 | | | 1.0 | 6.1 | 1.8 | 1.985 | 23.4 |
| E 356 | 75.6 | | | 15.2 | | 1.0 | 6.1 | 1.5 | 1.884 | 23.7 |
| E 354 | 82.5 | | | | 8.3 | 1.0 | 6.6 | 1.6 | 1.904 | 23.4 |
| E 362 | 59.5 | | | | 31.8 | 1.0 | 6.5 | 1.5 | 1.833 | 25.7 |
| E 361 | 65.8 | | | | 26.7 | 1.0 | 6.2 | 1.0 | 1.833 | 23.4 |
| W 151/E 359 | 83.0 | | | | 8.3 | 1.0 | 6.3 | 1.6 | 1.930 | 22.4 |

Table 3.—Percent by weight in runs

| Melt No. | $TeO_2$ | ZnO | $In_2O_3$ | $TiO_2$ | $GeO_2$ | $La_2O_3$ | $Bi_2O_3$ | $WO_3$ | $Ta_2O_5$ | $Tl_2O$ | $SiO_2$ | $Al_2O_3$ | $Na_2O_2$ | $n_D$ | $\nu$ |
|---|---|---|---|---|---|---|---|---|---|---|---|---|---|---|---|
| E 325 | 84.5 | | | | | 4.8 | | | | | 1 | 6.0 | 3.6 | 1.985 | 20.5 |
| E 334 | 74.0 | | | | | 18.5 | | | | | 1 | 6.6 | | 2.008 | 22.3 |
| E 367 | 83.0 | 8.3 | | | | | | | | | 1 | 6.3 | 1.6 | 2.016 | 20.1 |
| E 389 | 86.4 | 4.3 | | | | | | | | | 1 | 6.9 | 1.6 | 1.9996 | 20.6 |
| E 388 | 86.4 | | 4.3 | | | | | | | | 1 | 6.9 | 1.6 | 1.9722 | 21.2 |
| E 390 | 86.4 | | | 4.3 | | | | | | | 1 | 6.9 | 1.6 | 2.0237 | 18.9 |
| E 396 | 86.2 | | | | 4.3 | | | | | | 1 | 6.9 | 1.8 | 1.9873 | 21.5 |
| E 398 | 82.7 | | | | 8.3 | | | | | | 1 | 6.6 | 1.6 | 2.0515 | 21.5 |
| E 385 | 83.3 | | | | | | 8.2 | | | | 1 | 6.3 | 1.5 | 2.0222 | 19.5 |
| E 386 | 72.5 | | | | | | 18.1 | | | | 1 | 7.0 | 1.6 | 2.0391 | |
| E 375 | 83.3 | | | | | | | 8.2 | | | 1 | 6.3 | 1.5 | 2.038 | 19.4 |
| E 376 | 72.5 | | | | | | | 18.1 | | | 1 | 7.0 | 1.6 | 2.009 | 20.2 |
| E 377 | 83.3 | | | | | | | | 8.2 | | 1 | 6.3 | 1.5 | 2.007 | 20.3 |
| E 391 | 86.4 | | | | | | | | | 4.3 | 1 | 6.9 | 1.6 | 2.0371 | 19.1 |

Table 4.—Percent by weight in runs

| Melt No. | TeO$_2$ | TeO$_3$ | La$_2$O$_3$ | SiO$_2$ | Al$_2$O$_3$ | $n_D$ |
|---|---|---|---|---|---|---|
| E 395 | 42 | 42 | 8.2 | 1 | 7 | 2.0140 |

The compositions are not to be limited, according to the invention, to the above examples. The essential inventive thought comprises that more than 50 per cent by weight of tellurium oxide are to be melted to a glass with oxides of group III of the periodic table necessary to the glass formation, with for example aluminum oxide or, in given cases, with oxides and/or fluorides.

Having described our invention, what we claim is:

1. Optical glass consisting essentially of elements in the following range by percentages by weight:

Element: Percentages
- TeO$_2$ ———————————————— 59.5–93.5
- Al$_2$O$_3$ ———————————————— 3.6–7
- Na$_2$O$_2$ ———————————————— 0–3.8
- SiO$_2$ ———————————————— 0–2.7 and the remainder consisting of at least one member of the group of oxides lanthanum, zinc, indium, titanium, thallium, tantalun, germanium, tungsten and bismuth and the fluorides of lithium, calcium, strontium and barium.

2. An optical glass consisting essentially of tellurium oxide and aluminum oxide in the mol proportion of about 9 to 1.

References Cited in the file of this patent

UNITED STATES PATENTS

| | | |
|---|---|---|
| 1,995,952 | Taylor | Mar. 26, 1935 |
| 2,413,441 | Feichter | Dec. 31, 1946 |

FOREIGN PATENTS

| | | |
|---|---|---|
| 360,342 | Germany | 1922 |
| 44,373 | France | 1934 |

OTHER REFERENCES

Journal American Ceramic Society, vol. 30 (1947) pages 277–281.

Norton: Elements of Ceramics (1952), pages 148–150 and 155.